(12) United States Patent
Taylor et al.

(10) Patent No.: US 12,174,435 B2
(45) Date of Patent: Dec. 24, 2024

(54) INTEGRATED BOOT FOR A PROTECTED CABLE CONNECTOR ASSEMBLY

(71) Applicant: Chris Taylor, Gloucestershire (GB)

(72) Inventors: Chris Taylor, Gloucestershire (GB); Sam Leeman, Kessel-Lo (BE)

( * ) Notice: Subject to any disclaimer, the term of this patent is extended or adjusted under 35 U.S.C. 154(b) by 0 days.

(21) Appl. No.: 17/133,666

(22) Filed: Dec. 24, 2020

(65) Prior Publication Data

US 2021/0333486 A1  Oct. 28, 2021

(30) Foreign Application Priority Data

Apr. 24, 2020 (IN) .............................. 202013017579

(51) Int. Cl.
   *G02B 6/38*   (2006.01)

(52) U.S. Cl.
   CPC ......... *G02B 6/3887* (2013.01); *G02B 6/3825* (2013.01); *G02B 6/3893* (2013.01)

(58) Field of Classification Search
   CPC ...... G02B 6/38; G02B 6/3887; G02B 6/3825; G02B 6/3893
   See application file for complete search history.

(56) References Cited

U.S. PATENT DOCUMENTS

| | | | | |
|---|---|---|---|---|
| 7,637,673 | B2 * | 12/2009 | Oike .................... | G02B 6/3846 385/98 |
| 2010/0329627 | A1 * | 12/2010 | Donaldson ........... | G02B 6/3888 29/857 |
| 2021/0333486 | A1 * | 10/2021 | Taylor .................. | G02B 6/3893 |

* cited by examiner

*Primary Examiner* — Tina M Wong (74) *Attorney, Agent, or Firm* — Steven R. Fairchild; Michael J. Pennington (57) ABSTRACT

The present disclosure talks about an integrated boot for use with a connector. The connector is connected to an inner optical fibre cable. The integrated boot includes a boot part and an elf part. The elf part is integral to the boot part. The boot part holds the connector with the inner optical fibre cable. The boot part connects a first end of the inner optical fibre cable to the connector. The elf part is capable of engaging with a transport tube when the elf part is pushed into the transport tube. The inner optical fibre cable passes through the transport tube.

3 Claims, 11 Drawing Sheets

INTEGRATED BOOT FOR A PROTECTED CABLE CONNECTOR ASSEMBLY

BACKGROUND OF THE INVENTION

Field of the Invention

The present disclosure relates to the field of optical cable connectors. More particularly, the present disclosure relates to an integrated boot for a protected cable connector assembly and methods thereof. The present application claims priority from Indian Application Number 202013017579 filed on 24 Apr. 2020 and 201811042735 filed on 14 Nov. 2018, the disclosures of which are hereby incorporated by reference herein.

Description of the Related Art

Over the last few years there has been a significant rise in the use of optical fibre cables. The optical fibre cables are employed for a variety of applications. However, the optical fibre cables are primarily employed for networking and communication applications. In networking and communication applications, it is frequently desirable to make connections between different pairs of optical fibres. A variety of equipment is used to make these connections between different pairs of optical fibres. The variety of equipment includes optical connectors. The optical connectors enable optical coupling of optical fibre cable with fibre termination box. It is important to ensure that the connections provided by optical connectors are sufficiently strong to withstand environmental disturbances and various loads. However, these optical connectors are not environmentally robust. In addition, these optical connectors are not water proof. Moreover, these optical connectors are not weather proof. Further, these optical connectors are not provided with protective or shielding arrangements.

In light of the above, there is a need for an environmentally robust connector that overcomes the above stated disadvantages.

BRIEF SUMMARY OF THE INVENTION

In an aspect, the present disclosure provides an integrated boot for use with a connector. The connector is connected to an inner optical fibre cable. The integrated boot includes a boot part and an elf part. The elf part is integral to the boot part. The boot part holds the connector with the inner optical fibre cable. The boot part connects a first end of the inner optical fibre cable to the connector. The elf part is capable of engaging with a transport tube when the elf part is pushed into the transport tube. The inner optical fibre cable passes through the transport tube.

A primary object of the present disclosure is to provide an integrated boot for use with a fibre optic connector.

Another object of the present disclosure is to provide the integrated boot which prevents vibrations of an optical fibre cable connected to the fibre optic connector.

Yet another object of the present disclosure is to provide a collet tab which can join two cylindrical bodies.

Yet another object of the present disclosure is to enable engagement of a pre-terminated connector to housing of a fibre optic distribution box.

Yet another object of the present disclosure is to provide the pre-terminated connector which is field deployable.

Yet another object of the present disclosure is to provide the protected cable connector which can be engaged and disengaged from housing using click and unclick functionality.

Yet another object of the present disclosure is to provide a protected cable connector assembly that is easily affixed with fibre distribution boxes.

Yet another object of the present disclosure is to provide the protected cable connector assembly that is simple in construction.

In an embodiment of the present disclosure, the elf part removably engages with the transport tube.

In an embodiment of the present disclosure, the boot part is capable of providing strain relief at the connector.

In an embodiment of the present disclosure, the integrated boot prevents vibrations of the inner optical fibre cable in the transport tube from being transferred to the connector when the elf part is pushed into the transport tube.

In an embodiment of the present disclosure, the boot part has a cylindrical shape.

In an embodiment of the present disclosure, the elf part has a slotted cylindrical shape.

In an embodiment of the present disclosure, the connector is an LC connector.

In another aspect, the present disclosure provides a collet tab for locking a first cylindrical body and a second cylindrical body. The first cylindrical body has a first cylindrical cavity. The first cylindrical body is defined by a first housing-end and a first cable-end. The collet tab sits in the first cylindrical cavity. The second cylindrical body has a second cylindrical cavity. The second cylindrical body has a second housing-end and a second cable-end. The collet tab includes a cover arc structure and a locking arc structure. The locking arc structure is integral to the cover arc structure. The cover arc structure is defined by a first inner diameter $d_1$. The locking arc structure is defined by a second inner diameter $d_2$. The first inner diameter $d_1$ of the cover arc structure is greater than the second inner diameter $d_2$ of the locking arc structure. The locking arc structure protrudes out of the first cylindrical cavity of the first cylindrical body. The locking arc structure has a first tapered surface such that when the collet tab sits into the first cylindrical cavity of the first cylindrical body. The first tapered surface forms an acute angle from a central axis measured from the first cable-end. The second housing-end of the second cylindrical body is defined by a second tapered surface. The second tapered surface is capable of pushing the first tapered surface causing the locking arc structure to allow the first cylindrical body to pass till the locking arc structure fits into the second cylindrical cavity of the second cylindrical body when the second cylindrical body is pushed inside the first cylindrical body.

In an embodiment of the present disclosure, the second cylindrical body is connected to housing.

In yet another aspect, the present disclosure provides a method of engaging a pre-terminated connector to housing. The housing is engaged to a second cylindrical body. The method includes a set of steps. The set of steps include a first step of assembling the pre-terminated connector on an inner optical fibre cable. The set of steps include a second step of pushing the pre-terminated connector into the second cylindrical body. The pre-terminated connector engages into the second cylindrical body engaged with the housing using a collet tab when the pre-terminated connector is pushed into the second cylindrical body. The collet tab displaces sideways when the pre-terminated connector is pushed into the second cylindrical body till the collet tab locks into a second cylindrical cavity of the pre-terminated connector.

In an embodiment of the present disclosure, the pre-terminated connector is assembled according to a method. The pre-terminated connector is assembled on the inner optical fibre cable. The method includes a set of steps. The set of steps include a first step of engaging the first cylindrical body to the transport tube. The set of steps include a second step of blowing the inner optical fibre cable through a transport tube. The set of steps include a third step of feeding the inner optical fibre cable through an integrated boot. The set of steps include a fourth step of fitting the connector to an end of the inner optical fibre cable. The set of steps include a fifth step of pushing the integrated boot onto the connector. The set of steps include a sixth step of pushing the inner optical fibre cable into the integrated boot. The set of steps include a seventh step of pushing the transport tube onto the integrated boot. The integrated boot grips the inner optical fibre cable and pins the inner optical fibre cable to the transport tube. The set of steps include an eighth step of pushing the connector into the first cylindrical body that locks the transport tube onto the internal thread portion of the first cylindrical body. The connector is pushed into the first cylindrical body to allow assembling of the pre-terminated connector.

In an embodiment of the present disclosure, the transport tube is engaged with the first cylindrical body using threads.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Integrated boot.
102. Boot part.
104. Elf part.
106. Connector.
108. Inner optical fibre cable.
110. Transport tube.
202. Collet tab.
204. First cylindrical body.
206. Second cylindrical body.
208. First cylindrical cavity.
210. The first housing-end.
212. The first cable-end.
214. Second cylindrical cavity.
216. Second housing-end.
218. Second cable-end.
220. Cover arc structure.
222. Locking arc structure.
224. First tapered surface.
226. Central axis.
228. Second tapered surface.
300. Cross sectional view.
302. Pre-terminated connector.
304. Engagement of housing.
306. Second cylindrical body.
308. First cylindrical body.
800. Cable connector assembly.
802. Cable gland body.
804. Gland nut.
806. Grommet.
808. Protected connector.
812. Adapter.
814. Optical fibre distribution box.
816. Protective grip.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1:
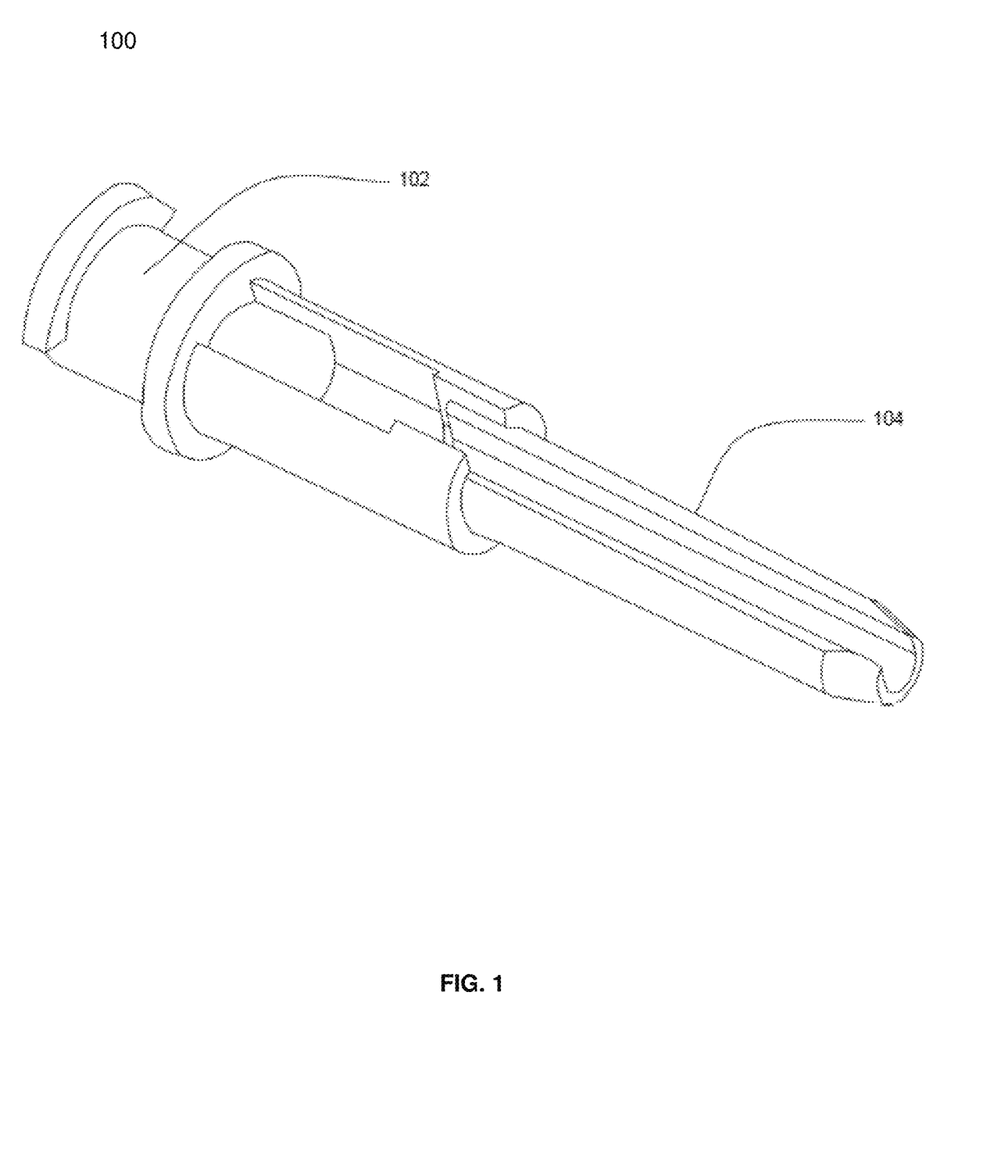
FIG. 1 illustrates an integrated boot, in accordance with an embodiment of the present disclosure.
Figure 2:
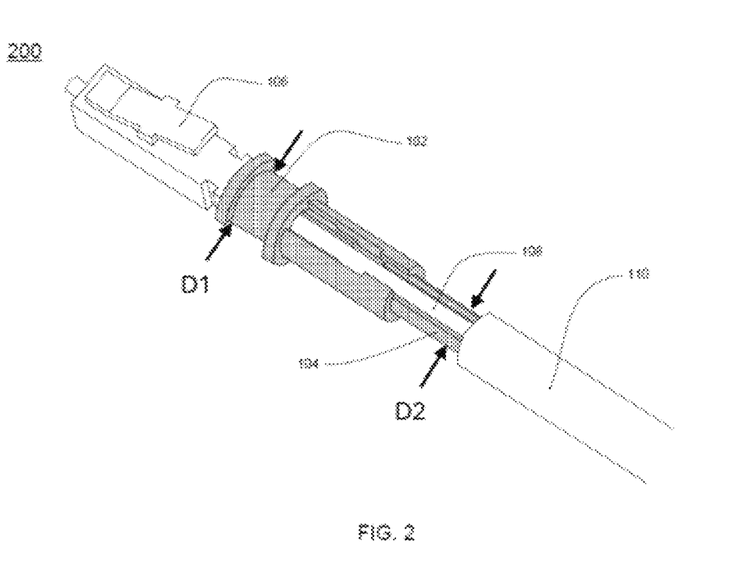
FIG. 2 illustrates the integrated boot connected with one or more components, in accordance with an embodiment of the present disclosure.

FIG. 1 illustrates an integrated boot 100, in accordance with an embodiment of the present disclosure. FIG. 2 illustrates the integrated boot 100 connected with one or more components, in accordance with an embodiment of the present disclosure. The integrated boot 100 includes a boot part 102 and an elf part 104 (as shown in FIG. 1). The one or more components connected with the integrated boot 100 include a connector 106, an inner optical fibre cable 108 and a transport tube 110 (as shown in FIG. 2). The elf part 104 is integral to the boot part 102. The boot part 102 and the elf part 104 constitute a single component i.e. the integrated boot 100. The integrated boot 100 is a cylindrical shaped component. In an embodiment of the present disclosure, the boot part 102 has a cylindrical shape. In an embodiment of the present disclosure, the elf part 104 has a slotted cylindrical shape.

The integrated boot 100 is configured to be used with a connector 106. The connector 106 is affixed to a first end of the inner optical fibre cable 108. The connector 106 is connected to the inner optical fibre cable 108 (as shown in FIG. 2). The integrated boot 100 is utilized to feed the inner optical fibre cable 108 into the transport tube 110. The connector 106 corresponds to a fibre optic connector. A connector terminates end of an optical fibre cable and mechanically couples and aligns cores of optical fibre. In addition, the connector 106 terminates end of an optical fibre cable to enable optical coupling with an optical fibre distribution box.

In an embodiment of the present disclosure, the connector 106 is a lucent connector. In another embodiment of the present disclosure, the connector 106 may be a subscriber connector or square connector or standard connector. In yet another embodiment of the present disclosure, the connector 106 is multiple fibre push-on connector. In yet another embodiment of the present disclosure, the connector 106 is any suitable connector of the like. In an embodiment of the present disclosure, the connector 106 is a factory fitted connector. In another embodiment of the present disclosure, the connector 106 is a field fitted connector. In yet another embodiment of the present disclosure, the connector 106 is any suitable connector of the like. The connector 106 enables the inner optical fibre cable 108 to easily terminate into an optical fibre distribution box. In an embodiment of the present disclosure, the connector 106 is a universal connector. Furthermore, the connector 106 can be easily affixed with the optical fibre distribution box when engaged with a housing of the optical fibre distribution box. Moreover, the connector 106 is compatible with a plurality of distribution boxes. Also, the connector 106 is a low cost connector.

The boot part 102 holds the connector 106 with the inner optical fibre cable 108. The boot part 102 connects a first end of the inner optical fibre cable 108 to the connector 106. The boot part 102 holds the inner optical fibre cable 108 into a body of the connector 106. In an embodiment of the present disclosure, the boot part 102 is capable of providing strain relief at the connector 106. The boot part 102 has a length shorter than a length of the elf part 104. In an embodiment of the present disclosure, the boot part 102 has a larger inner diameter than an inner diameter of the elf part 104. In an embodiment of the present disclosure, the boot part 102 is a hollow cylindrical body. In an embodiment of the present disclosure, the elf part 104 is a hollow cylindrical body. In an embodiment of the present disclosure, the cylindrical body of the elf part 104 has an opening for partially viewing the inner optical fibre cable 108.

The inner optical fibre cable 108 is pushed into the integrated boot 100 through the transport tube 110. The transport tube 110 is a hollow cylindrical tube. The inner optical fibre cable 108 passes through a hollow opening of the integrated boot 100 after passing through the transport tube 110. Accordingly, the inner optical fibre cable 108 is affixed with the connector 106 after the inner optical fibre cable 108 passes through the integrated boot 100. The connector 106 is affixed with a first open end of the inner optical fibre cable 108. The integrated boot 100 is affixed with the connector 106 which is affixed with the inner optical fibre cable 108. The integrated boot 100 is affixed by pushing the integrated boot 100 towards a first end of the connector 106. The inner optical fibre cable 108 is pushed into a body of the integrated boot 100 to trap the inner optical fibre cable 108 into the body of the integrated boot 100.

Accordingly, the elf part 104 is inserted into the transport tube 110. The elf part 104 is capable of engaging with the transport tube 110 when the elf part 104 is pushed into the transport tube 110. The inner optical fibre cable 108 passes through the transport tube 110. In an embodiment of the present disclosure, the elf part 104 removably engages with the transport tube 110. The elf part 104 can be disengaged from the transport tube 110 by pulling the integrated boot 100 out of the transport tube 110.

In an embodiment of the present disclosure, the integrated boot 100 prevents vibrations of the inner optical fibre cable 108 in the transport tube 110 from being transferred to the connector 106 when the elf part 104 is pushed into the transport tube 110.

Figure 3:
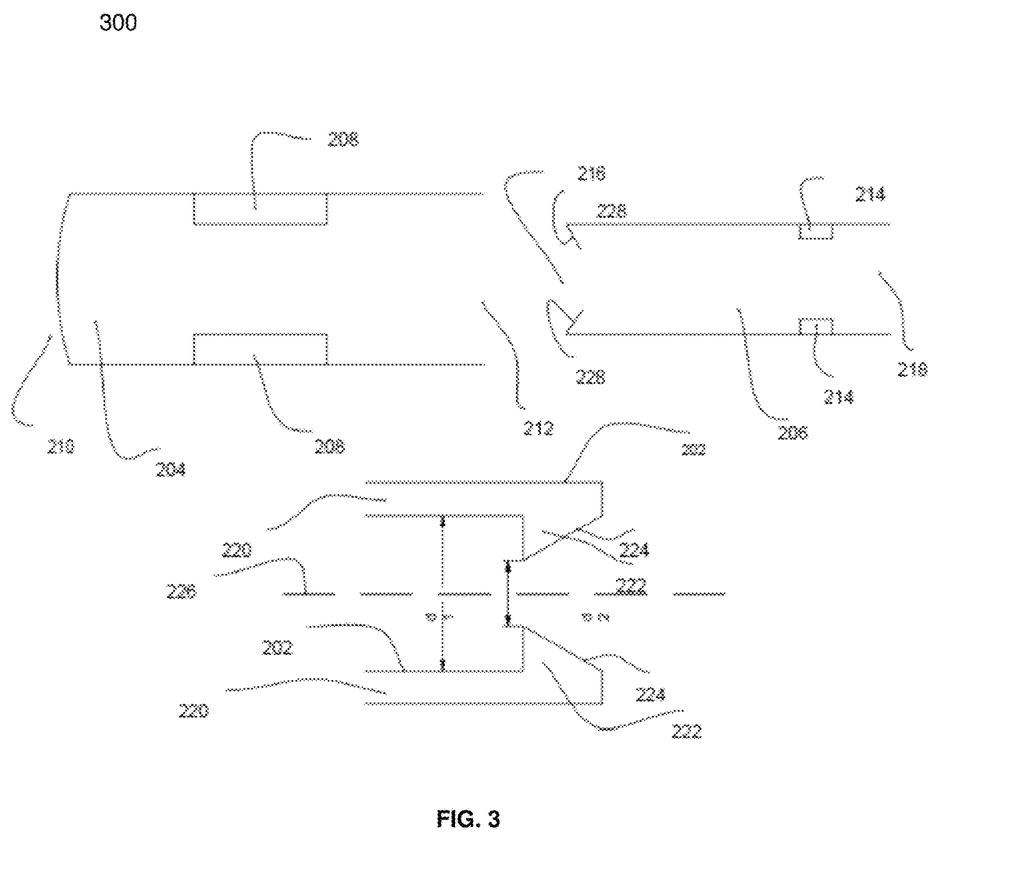
FIG. 3 illustrates a cross sectional view of a collet tab for locking two cylindrical bodies, in accordance with an embodiment of the present disclosure.

FIG. 3 illustrates a cross sectional view 300 of a collet tab 202 for locking two cylindrical bodies, in accordance with an embodiment of the present disclosure. The collet tab 202 is configured to lock two cylindrical bodies which include suitable cavities over a surface of both the cylindrical bodies. The cross sectional view 300 shows the collet tab 202, a first cylindrical body 204 and a second cylindrical body 206. The collet tab 202 is configured for locking the first cylindrical body 204 and the second cylindrical body 206. The collet tab 202 can be utilized in any type of mechanical equipment where two cylindrical bodies need to be connected with each other. The collet tab 202 is configured to sit in a cylindrical cavity of a cylindrical body which is to be connected with another cylindrical body.

The first cylindrical body 204 and the second cylindrical body 206 are shown here for illustrative purposes and may be any type of cylindrical body employed in any application. The first cylindrical body 204 has a first cylindrical cavity 208. In addition, the first cylindrical body 204 is defined by a first housing-end 210 and a first cable-end 212. The first housing-end 210 may be associated with any type of housing. The first cable-end 212 refers to an end for allowing any type of cable to enter the housing through the first housing-end 210. The collet tab 202 sits in the first cylindrical cavity 208. The second cylindrical body 206 has a second cylindrical cavity 214. The second cylindrical body 206 has a second housing-end 216 and a second cable-end 218.

The collet tab 202 includes a cover arc structure 220 and a locking arc structure 222. The locking arc structure 222 is integral to the cover arc structure 220. The collet tab 202 is a continuous structure with the cover arc structure 220 integrated with the locking arc structure 222 to form a single element. The cover arc structure 220 is defined by a first inner diameter $d_1$ (as shown in FIG. 3). The locking arc structure 222 is defined by a second inner diameter $d_2$ (as shown in FIG. 3). The first inner diameter $d_1$ of the cover arc structure 220 is greater than the second inner diameter $d_2$ of the locking arc structure 222. In an embodiment of the present disclosure, the cover arc structure 220 has the first inner diameter $d_1$ of about 10.6 millimetres. In another embodiment of the present disclosure, the first inner diameter $d_1$ of the cover arc structure 220 may vary. In an embodiment of the present disclosure, the locking arc structure 222 has the second inner diameter $d_2$ of about 16.5 millimetres. In another embodiment of the present disclosure, the second inner diameter $d_2$ of the locking arc structure 222 may vary.

The collet tab 202 is defined by a central axis 226. The central axis 226 passes through a centre of the collet tab 202. The locking arc structure 222 protrudes out of the first cylindrical cavity 208 of the first cylindrical body 204. The locking arc structure 222 has a first tapered surface 224. The first tapered surface 224 forms an acute angle from the central axis 226 measured from the first cable-end 212. The acute angle is formed when the collet tab 202 sits into the first cylindrical cavity 208 of the first cylindrical body 204.

The second housing-end 216 of the second cylindrical body 206 is defined by a second tapered surface 228. The first tapered surface 224 and the second tapered surface 228 correspond to a surface with decreasing thickness. The first tapered surface 224 and the second tapered surface 228 become gradually narrower at one end. The second cylindrical body 206 is pushed inside the first cylindrical body 204. The first cylindrical body 204 is fitted with the collet tab 202 which protrudes out of the first cylindrical cavity 208 of the first cylindrical body 204. The second tapered surface 228 of the second cylindrical body 206 pushes the first tapered surface 224 as the second cylindrical body 206 is pushed inside the first cylindrical body 204.

The locking arc structure 222 is pushed upwards as the second cylindrical body 206 is pushed inside the first cylindrical body 204. The locking arc structure 222 is pushed upwards by the second tapered surface 228 after coming in contact with the first tapered surface 224. Accordingly, the locking arc structure 222 of the collet tab 202 fitted in the first cylindrical body 204 fits into the second cylindrical cavity 214 of the second cylindrical body 206 as the first cylindrical body 204 allows the second cylindrical body 206 to pass. The second cylindrical body 206 passes through a hollow opening of the first cylindrical body 204. Accordingly, the first cylindrical body 204 is locked with the second cylindrical body 206. In an embodiment of the present disclosure, the second cylindrical body 206 is connected to a housing (described in FIG. 4).

Figure 4:
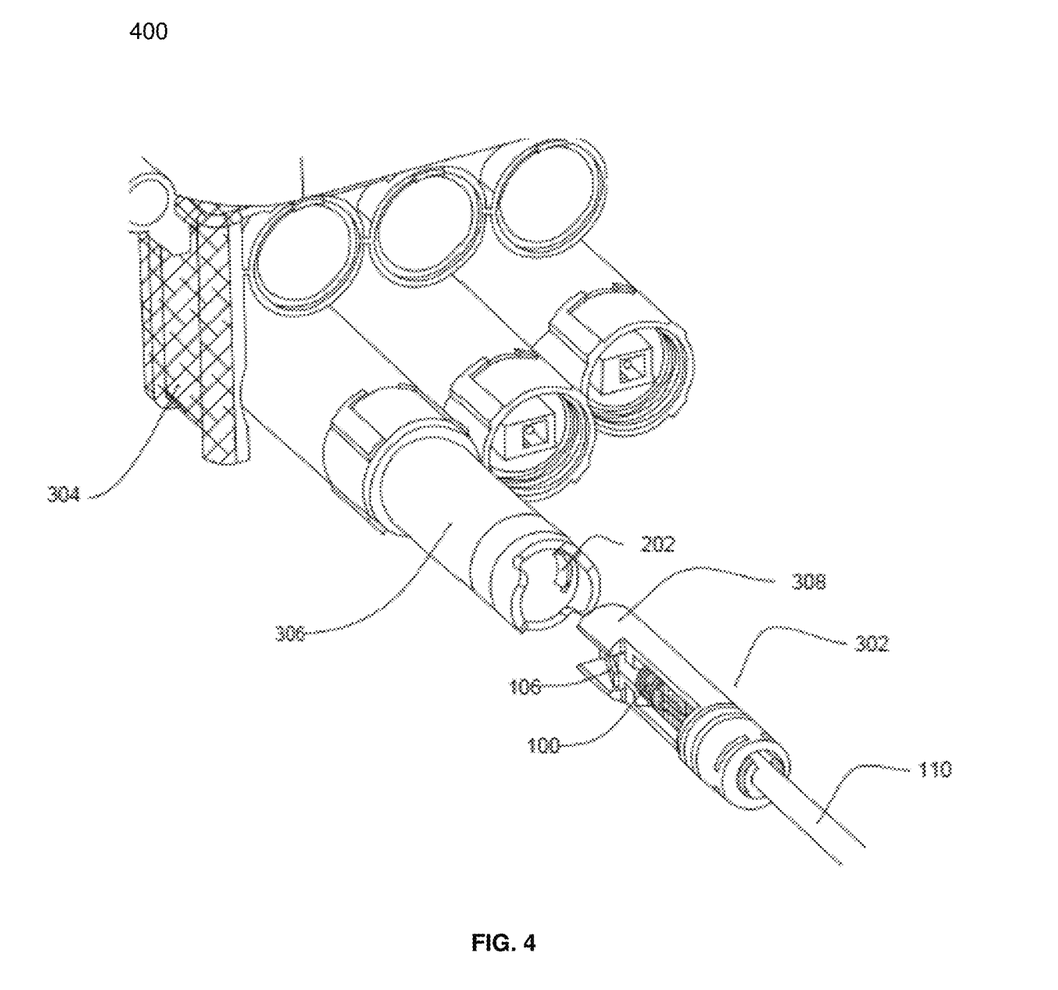
FIG. 4 illustrates engagement of a housing with a pre-terminated connector, in accordance with an embodiment of the present disclosure.
Figure 5:
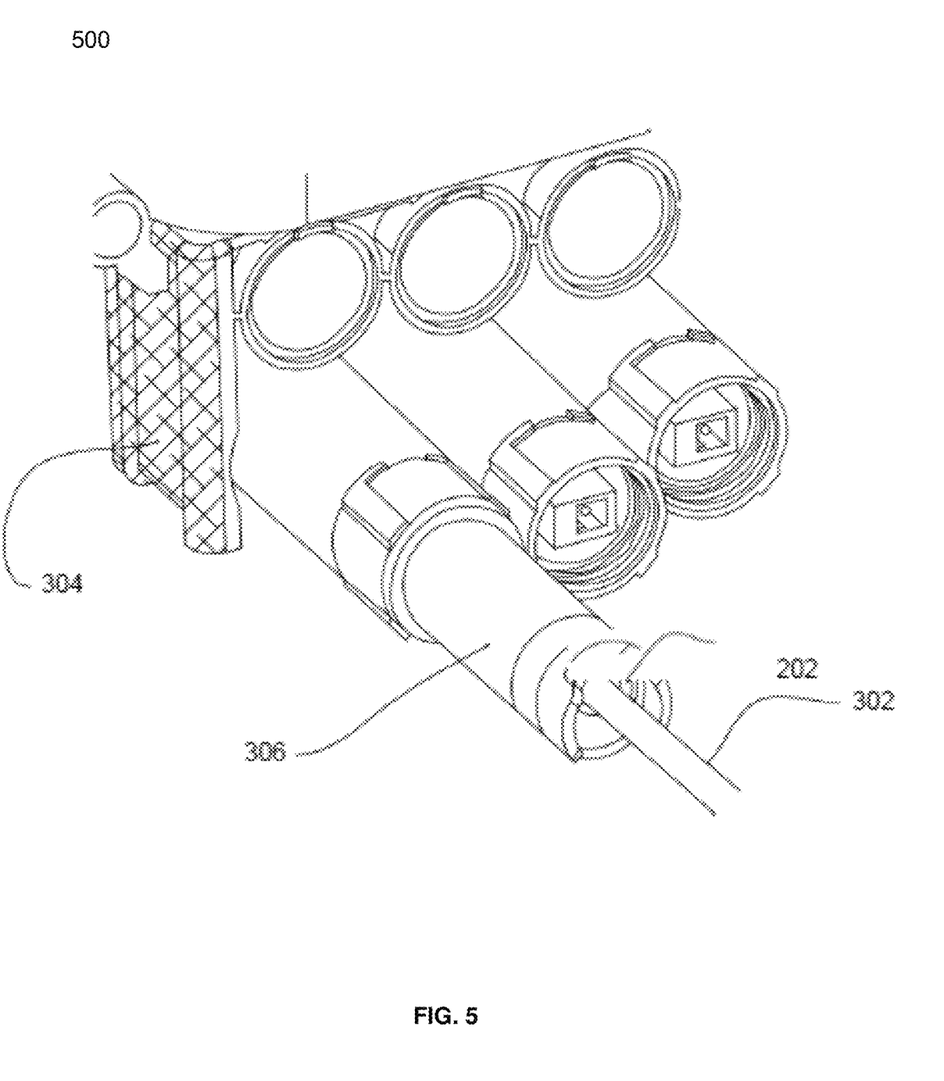
FIG. 5 illustrates an exploded view of the pre-terminated connector engaged with the housing, in accordance with another embodiment of the present disclosure.
Figure 6:
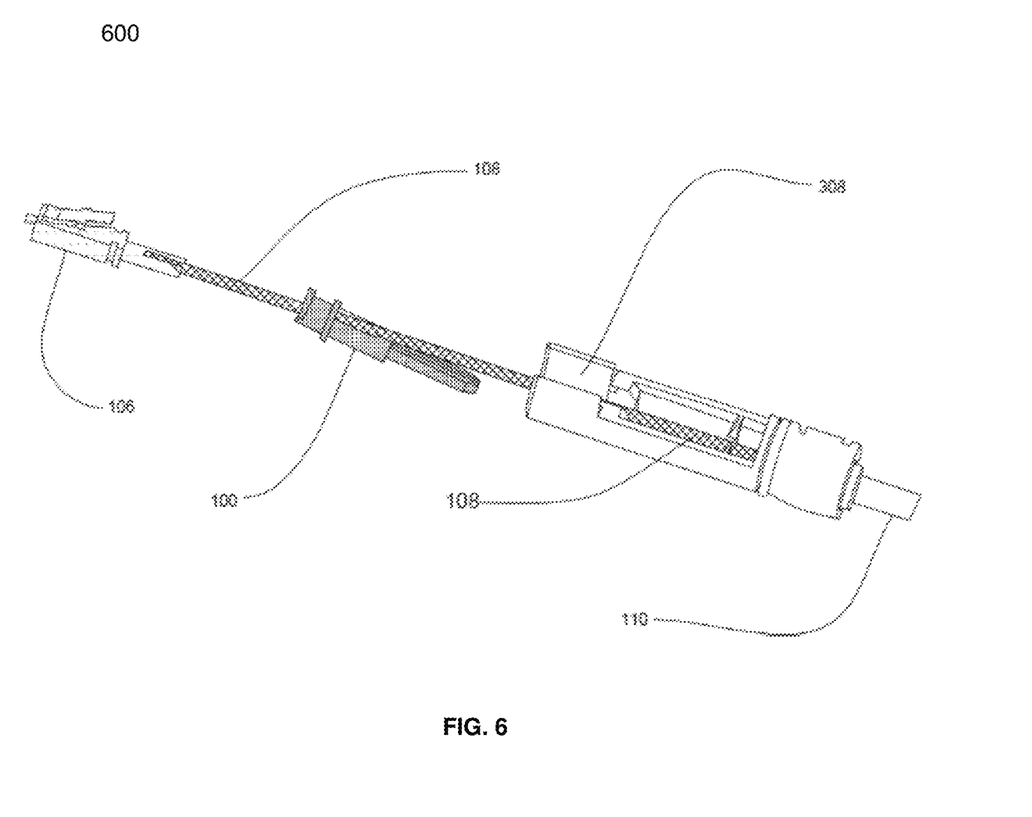
FIG. 6 illustrates assembling of the pre-terminated connector to be engaged with the housing, in accordance with an embodiment of the present disclosure.
Figure 7:
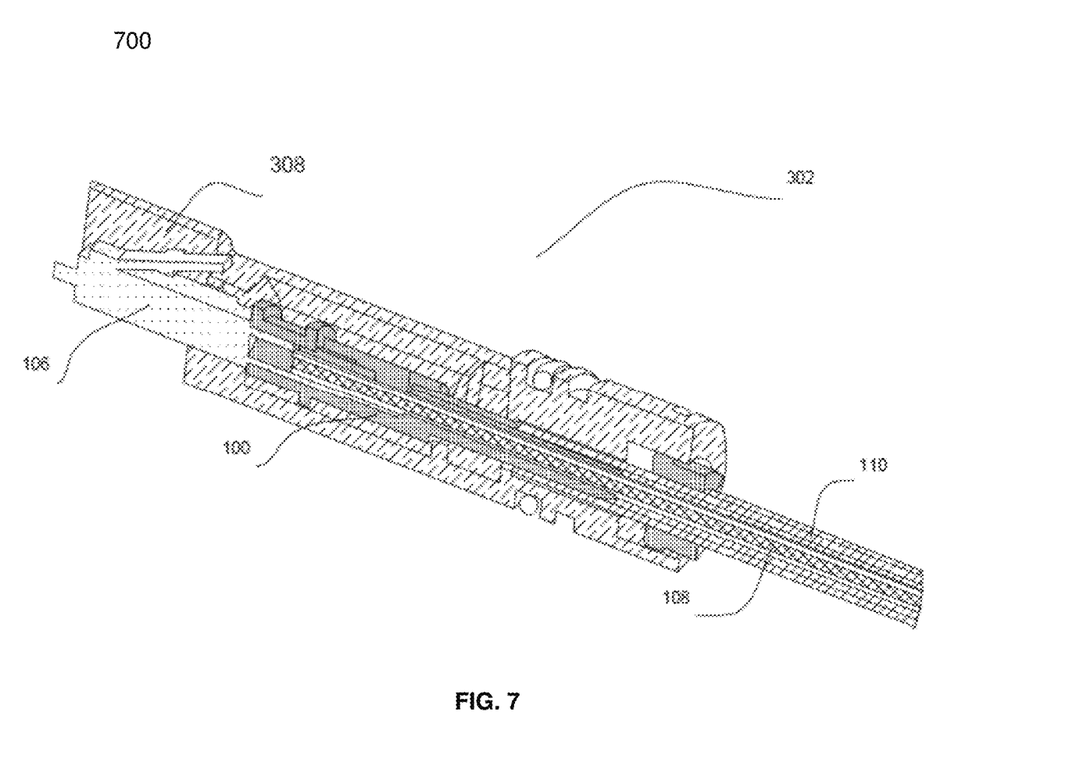
FIG. 7 illustrates an assembled cross sectional view for showing of the assembled pre-terminated connector to be engaged with the housing, in accordance with an embodiment of the present disclosure.

FIG. 4 illustrates engagement of a housing 304 with a pre-terminated connector 302, in accordance with an embodiment of the present disclosure. FIG. 5 illustrates the pre-terminated connector 302 engaged with the housing 304, in accordance with another embodiment of the present disclosure. FIG. 6 illustrates an exploded view 600 for showing assembling of the pre-terminated connector 302 to be engaged with the housing 304, in accordance with an embodiment of the present disclosure. FIG. 7 illustrates a cross sectional view 700 for showing the assembled pre-terminated connector 302 to be engaged with the housing 302, in accordance with an embodiment of the present disclosure.

The cross sectional view 400 illustrates the pre-terminated connector 302 ready to be connected with the housing 304. The cross sectional view 500 illustrates the pre-terminated connector 302 connected with the housing 304. The cross sectional view 600 illustrates the pre-terminated connector 302 ready to be assembled. The cross sectional view 700 illustrates the assembled pre-terminated connector 302 ready to be connected with the housing 304. The housing 304 is a housing of a fibre optic distribution box. A fibre optic distribution box provides optical cable interconnections between communication facilities, and integrates fibre splicing, fibre termination, fibre optic adapters and connectors and cable connections together in a single unit.

The housing 304 includes a second cylindrical body 306. The second cylindrical body 306 is similar to the first cylindrical body 204 of the FIG. 3. The second cylindrical body 306 includes the collet tab 202. The collet tab 202 allows the housing 304 to be engaged with the pre-terminated connector 302. In addition, the pre-terminated connector 302 includes a first cylindrical body 308, the connector 106, the integrated boot 100, the inner optical fibre cable 108 and the transport tube 110. The first cylindrical body 308, the connector 106, the integrated boot 100, the inner optical fibre cable 108 and the transport tube 110 are assembled to form the pre-terminated connector 302.

In an embodiment of the present disclosure, the pre-terminated connector 302 is assembled according to a method. The pre-terminated connector 302 is assembled on the inner optical fibre cable 108. The method corresponds to the FIG. 6 and FIG. 7. The method includes a set of steps. The set of steps include a first step of engaging the first cylindrical body 308 to the transport tube 110. In an embodiment of the present disclosure, the transport tube 110 is engaged with the first cylindrical body 308 using threads. In an embodiment of the present disclosure, the threads of the first cylindrical body 308 include an internal thread portion. The internal thread portion is located at an inner portion of the first cylindrical body 308.

The set of steps include a second step of blowing the inner optical fibre cable 108 through the transport tube 110. In an embodiment of the present disclosure, the inner optical fibre cable 108 is blown through the transport tube 110 using a blowing machine. In another embodiment of the present disclosure, the inner optical fibre cable 108 is blown through the transport tube 110 by any suitable means. The set of steps include a third step of feeding the inner optical fibre cable 108 through the integrated boot 100 (as shown in FIG. 2 and explained in the detailed description of FIG. 2). The set of steps include a fourth step of fitting the connector 106 to an end of the inner optical fibre cable 108 (as shown in FIG. 2 and explained in the detailed description of FIG. 2).

The set of steps include a fifth step of pushing the integrated boot 100 onto the connector 106 (as shown in FIG. 2 and explained in the detailed description of FIG. 2). The set of steps include a sixth step of pushing the inner optical fibre cable 108 into the integrated boot 100 (as shown in FIG. 2 and explained in the detailed description of FIG. 2). The set of steps include a seventh step of pushing the transport tube 110 onto the integrated boot 100 (as shown in FIG. 2 and explained in the detailed description of FIG. 2). The integrated boot 100 grips the inner optical fibre cable 108 and pins the inner optical fibre cable 108 to the transport tube 110.

The set of steps include an eighth step of pushing the connector 106 into the first cylindrical body 308 that locks the transport tube 110 onto the internal thread portion of the first cylindrical body 308. The connector 106 is pushed into the first cylindrical body 308 to allow assembling of the pre-terminated connector 302 (as shown in FIG. 7). The connector 106 has one or more retention properties. The one or more retention properties include but may not be limited to click, unclick, and unwind. In an example, clicking and unclicking of the connector 106 prevents air access in the first cylindrical body 308. Also, the one or more retention properties of the connector 106 enable unplugging of the connector 108. Also, the connector 106 is field deployable connector.

In an embodiment of the present disclosure, the integrated boot 100 is locked into the internal threaded portion of the first cylindrical body 308 as the connector 106 is pushed into the internal threaded portion of the first cylindrical body 308. In an embodiment of the present disclosure, the connector 106 clips into a plurality of retention features of the first cylindrical body 308.

The pre-terminated connector 302 is engaged with the housing 304 by a method. The housing 304 is engaged to the second cylindrical body 306. The method includes a set of steps. The set of steps include a first step of assembling the pre-terminated connector 302 on the inner optical fibre cable 108 (as explained above). The set of steps include a second step of pushing the pre-terminated connector 302 into the second cylindrical body 306. The pre-terminated connector 302 engages into the second cylindrical body 306 engaged with the housing 304 using a collet tab 202 when the pre-terminated connector 302 is pushed into the second cylindrical body 306. The collet tab 202 displaces sideways when the pre-terminated connector 302 is pushed into the second cylindrical body 306 till the collet tab 202 locks into a second cylindrical cavity of the pre-terminated connector 302. The second cylindrical cavity of the pre-terminated connector 302 is similar to the second cylindrical cavity 214 of the second cylindrical body 206 shown in FIG. 3.

In an embodiment of the present disclosure, the collet tab 202 includes a chamfer which helps the collet tab 202 to move aside when the pre-terminated connector 302 is pushed in the second cylindrical body 306. In an embodiment of the present disclosure, the first cylindrical body 308 includes a chamfer on a front portion of the first cylindrical body 308 which helps the collet tab 202 to move aside when the pre-terminated connector 302 is pushed in the second cylindrical body 306. In an embodiment of the present disclosure, the collet tab 202 springs back into place when the pre-terminated connector 302 is fully pushed in the second cylindrical body 306.

It is to be noted that in FIG. 4 and FIG. 5, there is only one collet tab 202 visible; however, there is another collet tab located opposite to the collet tab 202.

In an embodiment of the present disclosure, the second cylindrical body 306 is screwed to the housing 304. In an embodiment of the present disclosure, the pre-terminated connector 302 can be removed from the second cylindrical body 306 by unscrewing the second cylindrical body 306 to give access to a release tab of the connector 106 to enable unplugging of the pre-terminated connector 302.

Figure 8:
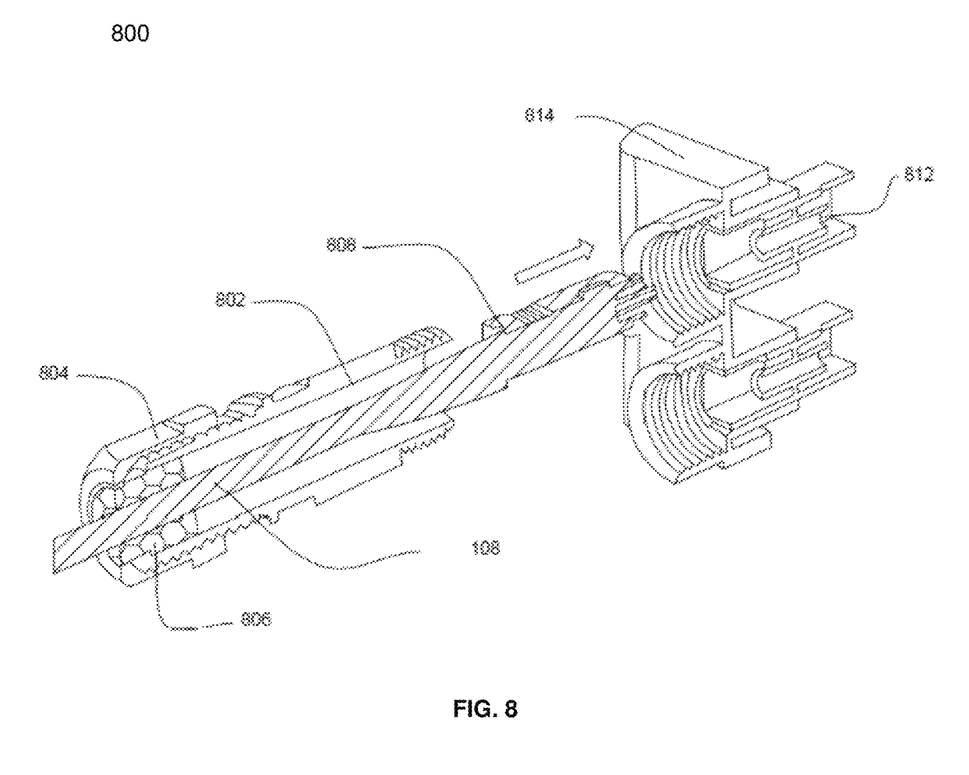
FIG. 8 illustrates an exploded cross sectional view of a protected cable connector assembly, in accordance with an embodiment of the present disclosure.
Figure 9:
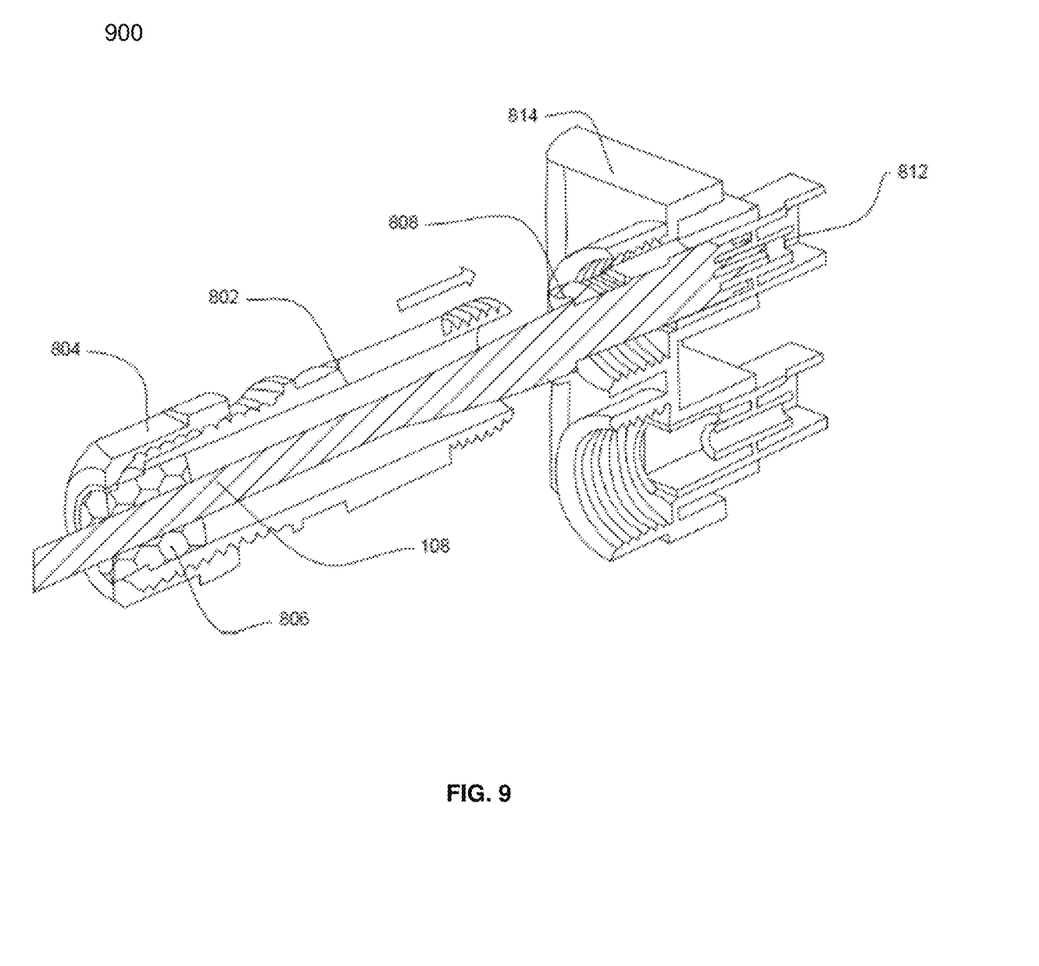
FIG. 9 illustrates a semi-exploded cross sectional view of the protected cable connector assembly of FIG. 8, in accordance with an embodiment of the present disclosure.
Figure 10:
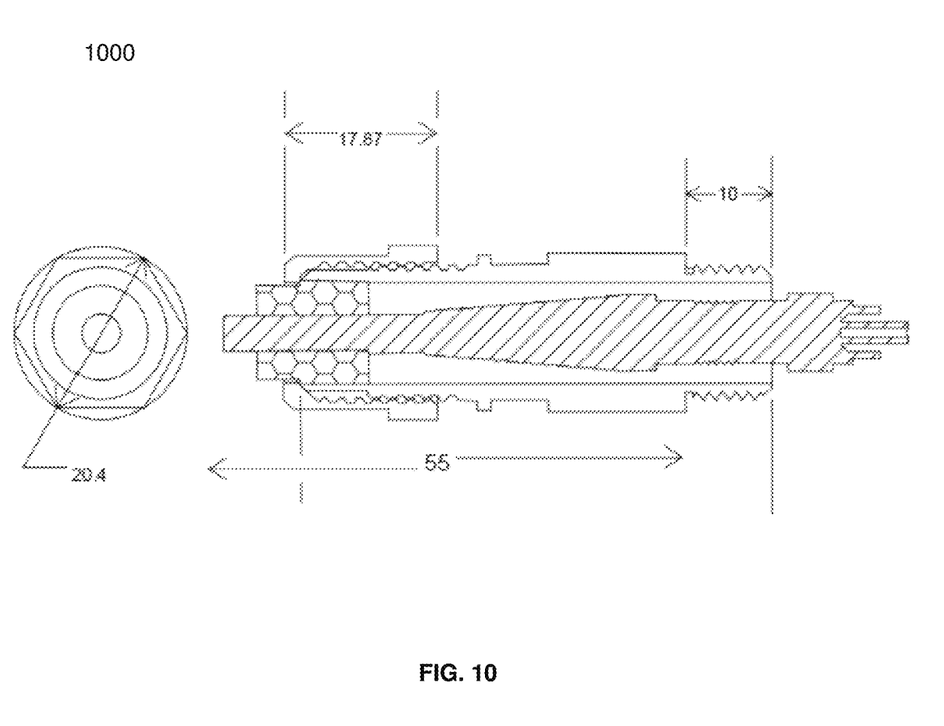
FIG. 10 illustrates side view of the protected cable connector assembly of FIG. 8 along with dimensions, in accordance with an embodiment of the present disclosure.

FIG. 8 illustrates an exploded cross sectional view of a protected cable connector assembly 800, in accordance with various embodiments of the present disclosure. FIG. 9 illustrates a semi-exploded cross sectional view of the protected cable connector assembly 800, in accordance with various embodiment of the present disclosure. The protected cable connector assembly 800 provides housing for optical fibre cable connector. In general, optical fibre connector terminates end of an optical fibre cable, and enables rapid connection and disconnection. The protected cable connector assembly 800 connects end of first optical fibre cable with second optical fibre cable. In addition, the protected cable connector assembly 100 mechanically couples and aligns the cores of fibres so light can pass. Further, the protected cable connector assembly 800 ensures proper alignment of the fibres to minimize losses. Furthermore, the protected cable connector assembly 800 enables optical connection of fibres of the first optical fibre cable with fibres of the second optical fibre cable or cables. Moreover, the protected cable connector assembly 800 ensures maximum axial alignment of respective fibre pairs. Also, the protected cable connector assembly 800 is characterized by a diameter. The diameter is overall diameter of circular cross section of the protected cable connector assembly 800. In addition, the diameter is largest external diameter of cross-section of the protected cable connector assembly 800. Further, the diameter of the protected cable connector assembly 800 is about 20.4 millimetres (as shown in FIG. 10). In an embodiment of the present disclosure, the protected cable connector assembly 800 has any suitable value of diameter.

Further, the protected cable connector assembly 800 facilitates to terminate optical fibre cable into a distribution enclosure. The protected cable connector assembly 800 ensures proper alignment of optical fibre cable with the distribution enclosure to minimize losses. In addition, the protected cable connector assembly 800 enables pairing of connector and adapter. The connector adapter pairing ensures proper alignment of optical fibre cable with the distribution enclosure to minimize losses. The optical fibre cable connector assembly 800 provides water proof housing to cable connector. The protected cable connector assembly 800 provides environmentally robust housing for cable connector. In addition, the protected optical fibre cable connector housing 800 provides strain relief to the optical fibre cable.

The protected cable connector assembly 800 includes a plurality of elements. The protected cable connector assembly 800 includes a cable gland body 802, a gland nut 804, a grommet 806 and a protected connector 808. Further, the protected cable connector assembly 800 includes an optical fibre cable 108, an adapter 812, an optical fibre distribution box 814 and a protective grip 816. The plurality of elements of the protected cable connector assembly 800 enable improvement in a plurality of characteristics of the protected connector 808. The plurality of properties of the protected connector 808 includes mechanical characteristics, optical characteristics and physical characteristics. In an embodiment of the present disclosure, the plurality of characteristics includes any suitable characteristics of the like.

The protected cable connector assembly 800 includes the cable gland body 802. The cable gland body 802 is similar to the first cylindrical body 308 of the FIGS. 4, 5, 6 and 7. In general, cable gland corresponds to a component designed to attach and secure one end of an optical cable to any equipment. The cable gland body 802 is characterized by a first substantially cylindrical cross section. The cable gland body 802 is hollow cylindrical body. The first substantially cylindrical cross section of the cable gland body 802 is hollow cylindrical body. In addition, the first substantially cylindrical cross section of the cable gland body 802 includes a first threaded portion and a second threaded portion. Further, the first substantially cylindrical cross section of the cable gland body 802 includes an unthreaded portion. The first threaded portion is at first end of the first substantially cylindrical cross section of the cable gland body 802. The first threaded portion corresponds to external threads over periphery of the first substantially cylindrical cross section of the cable gland body 802. The second threaded portion is at a second end of the first substantially cylindrical cross section of the cable gland body 802. The second threaded portion corresponds to external threads over periphery of the first substantially cylindrical cross section of the cable gland body 802. The unthreaded portion of the cable gland body 802 corresponds to central non-threaded portion between the first threaded portion and the second threaded portion.

The cable gland body 802 is characterized by an inner diameter and an outer diameter. The inner diameter is diameter of internal hollow cylindrical cross section of the cable gland body 802. The outer diameter is external diameter of cylindrical cross section of the cable gland body 802. The cable gland body 802 is characterized by a first length, a second length and a third length. The first length is length of the first threaded portion of the cable gland body 802. The first length is measured from the first end of the cable gland body 802 to first end of the unthreaded portion. The second length is length of the unthreaded portion of the cable gland body 802. The second length is measured from the second end of the cable gland body 802 to second end of the unthreaded portion. The third length is length of the second threaded portion of the cable gland body 802. The third length of the cable gland body 802 is about 10 millimetres. In an embodiment of the present disclosure, the cable gland body 802 has any suitable value of third length. The sum of the first length, the second length and the third length is total length of the cable gland body 802. The total length of the cable gland body 802 is about 55 millimetres. In an embodiment of the present disclosure, the cable gland body 802 has any suitable value of the total length (as shown in FIG. 10).

The protected cable connector assembly 800 incudes the gland nut 804. In general, gland nut corresponds to a nut for fastening on cable glands to enable a secure connection for the optical fibre cable. The gland nut 804 is characterized by a second substantially cylindrical cross section. The second substantially cylindrical cross section of the gland nut 804 is hollow cylindrical cross section. The gland nut 804 includes internal threads. The gland nut 804 is characterized by an inner diameter, an outer diameter and a total length. The inner diameter is diameter of internal hollow cylindrical cross section of the gland nut 804. The outer diameter is external diameter of cylindrical cross section of the gland nut 804. The inner diameter of the gland nut 804 is comparable to external diameter of the cable gland body 802. The total length is length of the gland nut 804. The length of the gland nut 804 is about 17.87 millimetres. In an embodiment of the present disclosure, the gland nut 804 has any suitable value of total length (as shown in FIG. 10).

Further, the internal threads of the gland nut 804 correspond to threads of the first threaded portion of the cable gland body 802. The internal threads of the gland nut 804 engage with threads of the first threaded portion of the cable gland body 802. The gland nut 804 is fastened on the cable gland body 802 with facilitation of threads. The gland nut 804 is fastened on the cable gland body 802 to ensure firm grip on the inner optical fibre cable 108. The gland nut 804 is fastened on the cable gland body 802 to ensure optical connection between the inner optical fibre cable 108 and the optical fibre distribution box 814. In an embodiment of the present disclosure, the gland nut 804 is fastened on the cable gland body 802 with facilitation of any suitable fastening mechanism of the like.

The protected cable connector assembly 800 includes the grommet 806. The grommet 806 is similar to the transport tube 110 of the FIG. 2. The grommet 806 is positioned partially inside the cable gland body 802. In general, grommet is a tube or ring like structure through which an optical cable passes. In addition, the grommet 806 facilitates the protected cable connector assembly 800 to firmly hold the inner optical fibre cable 108. Further, the grommet 806 is positioned partially inside the first end of the cable gland body 802. Furthermore, the grommet 806 seals the first end of the cable gland body 802 as the gland nut 804 is fastened on the first threaded portion of the cable gland body 802. Moreover, the grommet 806 enables a firm grip over the inner optical fibre cable 108 as the gland nut 804 is fastened on the first threaded portion of the cable gland body 802. Also, the grommet 806 has a cylindrical shape with a hollow circular cavity. The cylindrical shape of the grommet 806 is characterized by an outer diameter and an inner diameter. The outer diameter is diameter of outer periphery of cylindrical shape of the grommet 806. The inner diameter is diameter of the hollow circular cavity in the cylindrical shape of the grommet 806.

The outer diameter of the grommet 806 is comparable to inner diameter of the cable gland body 802. In an embodiment of the present disclosure, the grommet 806 has any suitable outer diameter. The inner diameter of the grommet 806 is comparable to diameter of the inner optical fibre cable 108. The grommet 806 is compressed as the gland nut 804 is fastened on the first threaded portion of the cable gland body 802. In addition, the grommet 806 is compressed to a suitable degree of compression. The suitable degree of compression is achieved and adjusted with facilitation of the gland nut 804. The gland nut 804 is fastened or loosened on the cable gland body 802 to adjust the suitable degree of compression. In an embodiment of the present disclosure, the grommet 806 is formed of rubber. In another embodiment of the present disclosure, the grommet 806 is formed of any suitable compressible material of the like. In yet another embodiment of the present disclosure, the grommet 806 is formed of any suitable material of the like.

The protected cable connector assembly 800 includes the protected connector 808. The protected connector 808 is similar to the connector 106 described above. The protected connector 808 terminates end of the inner optical fibre cable 108 to enable optical coupling with the optical fibre distribution box 814. The protected connector 808 is characterized by negligible transmission loss due to reflection or misalignment of the fibres. The protected connector 808 is affixed to a first end of the inner optical fibre cable 108. The protected connector 808 is a lucent connector. In an embodiment of the present disclosure, the protected connector 808 is a subscriber connector or square connector or standard connector. In another embodiment of the present disclosure, the protected connector 808 is multiple fibre push-on connector. In yet another embodiment of the present disclosure, the protected connector 808 is any suitable connector of the like.

In an embodiment of the present disclosure, the protected connector 808 is a factory fitted connector. In another embodiment of the present disclosure, the protected connector 808 is a field fitted connector. In yet another embodiment of the present disclosure, the protected connector 808 is any suitable connector of the like. The protected connector 808 enables the inner optical fibre cable 108 to easily terminate into the optical fibre distribution box 814. In addition, the protected connector 808 enables the inner optical fibre cable 108 to terminate into the optical fibre distribution box 814. Further, the protected connector 808 is a universal connector. Furthermore, the protected connector 808 is easily affixed with the optical fibre distribution box 814. Moreover, the protected connector 808 is compatible with a plurality of distribution boxes. Also, the protected connector 808 is a low cost connector.

The protected cable connector assembly 800 includes the inner optical fibre cable 108. In general, optical cable is an assembly containing one or more optical fibres that are used to carry light. The inner optical fibre cable 108 is used for different applications. The different applications include long distance telecommunication, data transmission, and providing a high-speed data connection and the like. The inner optical fibre cable 108 is terminated into the optical fibre distribution box 814. The inner optical fibre cable 108 includes a first open end. The first open end of the inner optical fibre cable 108 is terminated into the optical fibre distribution box 814. The protected connector 808 is affixed at the first open end of the inner optical fibre cable 108. The protected connector 808 aligns the inner optical fibre cable 108 with optical transmission element of the optical fibre distribution box 814. The protected connector 808 ensures minimum transmission losses in termination of the inner optical fibre cable 108.

The inner optical fibre cable 108 is characterized by a substantially circular cross section. The inner optical fibre cable 108 is characterized by an outer diameter. The outer diameter is diameter of periphery of circular cross section of the inner optical fibre cable 108. The outer diameter of the inner optical fibre cable 108 is comparable to the inner diameter of the grommet 806. The inner optical fibre cable 108 is received through the grommet 806 into the cable gland body 802. The inner optical fibre cable 108 is received through the grommet 806 when gland nut 804 is loose. The gland nut 804 is fastened on the cable gland body 802 to enable the grommet 806 to completely seal and grip the inner optical fibre cable 108. The gland nut 804 is fastened on the cable gland body 802 to ensure firm grip of the grommet 806 on the inner optical fibre cable 108.

The protected connector assembly 800 includes the adapter 812 and the optical fibre distribution box 814. The optical fibre distribution box 814 includes the adapter 812. In general, distribution box provides optical cable interconnections between communication facilities, and integrates fibre splicing, fibre termination, fibre optic adapters and connectors and cable connections together in a single unit. In an embodiment of the present disclosure, the optical fibre distribution box 814 includes a plurality of adapters 812. The adapter 812 facilitates in termination of the inner optical fibre cable 108 into the optical fibre distribution box 814. The inner optical fibre cable 108 is affixed with the protected connector 808. The protected connector 808 engages with the adapter 812 to enable termination of the inner optical fibre cable 108. The adapter 812 is characterized by a cross sectional shape. The cross sectional shape of the adapter 812 is corresponding to shape of the protected connector 808. The protected connector 808 slides and fits into the adapter 812.

The optical fibre distribution box 814 includes hollow cylindrical protrusions at one or more positions. The hollow cylindrical protrusion at each of the one or more positions is characterized by an inner diameter. The inner diameter of the hollow cylindrical protrusion at each of the one or more positions is internal diameter of the hollow cylinder. The inner diameter of the hollow cylindrical protrusion at each of the one or more positions is comparable to the outer diameter of the second threaded portion. The hollow cylindrical protrusion at each of the one or more positions includes internal threads. The second threaded portion of the cable gland body 802 is fastened on the internal threads of the hollow cylindrical protrusion. The second threaded portion of the cable gland body 802 engages with the internal threads of hollow cylindrical protrusion of the optical fibre distribution box 814. The cable gland body 802 is fastened with the optical fibre distribution box 814 to enable engagement of the protected connector 808 and the adapter 812.

The protected connector 808 engages with the adapter 812 within a protective housing. The protective housing is enabled by the cable gland body 802, the gland nut 804, the grommet 806, the adapter 812 and the optical fibre distribution box 814. The cable gland body 802 is fastened with the optical fibre distribution box 814 to enable the protective housing for the protected connector 808. The protective housing acts as ruggedized housing of the protected connector 808. The protective housing of the protected connector 808 is water proof housing. The protective housing of the protected connector 808 is environmentally robust housing. The protective housing of the protected connector 808 is weather proof. The protective housing of the protected connector 808 enables safe and secure termination of the inner optical fibre cable 108 into the optical fibre distribution box 814. The protective housing of the protected connector 808 eliminates transmission losses occurring during termination of the inner optical fibre cable 108. The protective housing of the protected connector 808 is ruggedized shell.

Figure 11:
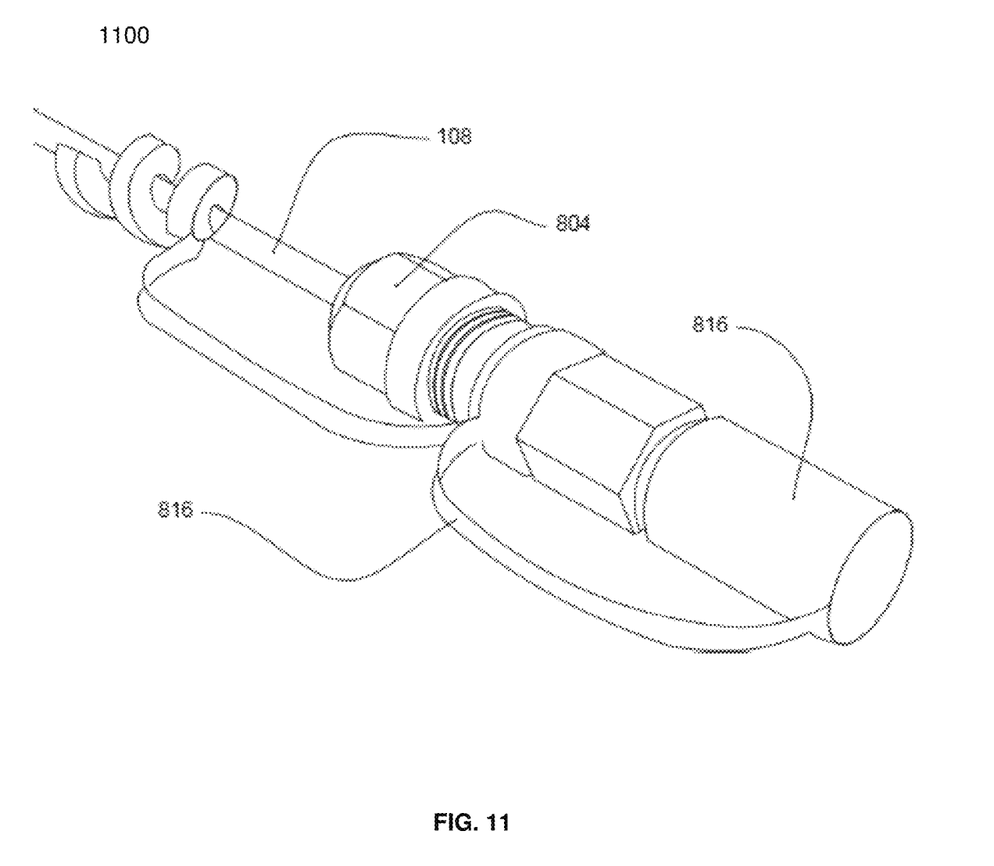
FIG. 11 illustrates cross sectional view of the protected cable connector assembly with a protective grip, in accordance with an embodiment of the present disclosure.

FIG. 11 illustrates a cross sectional view 1100 of the protected cable connector assembly 800 with the protective grip 816, in accordance with various embodiments of the present disclosure. The protected cable connector assembly 800 includes the protective grip 816. The protective grip 816 is protection and safety cover of the protected cable connector assembly 800. The protective grip 816 is a robust outer covering of the protected cable connector assembly 800. The protective grip 816 prevents components from slipping down from the protected cable connector assembly 800. The protective grip 816 prevents components of the protected cable connector assembly 800 from slipping down the inner optical fibre cable 108. In an embodiment of the present disclosure, the protective grip 816 enables any suitable characteristics of the like.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An integrated boot for use with a connector, wherein the connector is connected to an inner optical fibre cable, the integrated boot comprising:
    a boot part, the boot part holds the connector with the inner optical fibre cable, wherein the boot part connects a first end of the inner optical fibre cable to the connector, wherein the connector terminates an end of the optical fibre cable to enable optical coupling with an optical fibre distribution box, wherein the boot part has a solid cylindrical shape with first diameter D1;
    wherein the boot part is capable of providing strain relief at the connector; and
    an elf part is integral to the boot part, wherein the elf part is capable of firmly engaging with a transport tube when the elf part is pushed into the transport tube, wherein the inner optical fibre cable passes through the transport tube while being placed in the elf part,
    wherein the elf part has a slotted cylindrical shape with a second diameter D2,
    wherein the first diameter D1 of the boot part is larger than the second diameter D2 of the elf part for firmly engaging the elf part with the transport tube when the elf part is pushed in to the transport tube and disengaging the elf part from the transport tube when the elf part is pulled out of the transport tube,
    wherein the integrated boot prevents vibrations of the inner optical fibre cable in the transport tube from being transferred to the connector when the elf part is pushed into the transport tube.

2. The integrated boot as claimed in claim 1, wherein the elf part removably engages with the transport tube.

3. The integrated boot as claimed in claim 1, wherein the connector is an LC connector.

* * * * *